United States Patent [19]
Thomas

[11] 3,864,050
[45] Feb. 4, 1975

[54] HOLDING MECHANISM FOR TAPE CARTRIDGE

[76] Inventor: Michael D. Thomas, 640 Fern Ct., Elmhurst, Ill. 60126

[22] Filed: Feb. 28, 1974

[21] Appl. No.: 446,594

[52] U.S. Cl. .......... 403/329, 403/330, 242/55.19 A, 360/93
[51] Int. Cl. ............ F16b 2/16
[58] Field of Search ............... 403/329, 330, 24, 42; 242/55.19 A; 360/93, 94; 16/141, 147

[56] References Cited

UNITED STATES PATENTS

| | | | |
|---|---|---|---|
| 2,616,112 | 11/1952 | Smulski | 403/329 X |
| 3,521,009 | 7/1970 | Auld | 242/55.19 UX A |
| 3,552,751 | 1/1971 | Kelso | 360/94 |
| 3,633,920 | 1/1972 | Ban | 242/55.19 A X |
| 3,642,288 | 2/1972 | Camras | 242/55.19 A X |

*Primary Examiner*—Jordan Franklin
*Assistant Examiner*—Wayne L. Shedd
*Attorney, Agent, or Firm*—Dressler, Goldsmith, Clement & Gordon, Ltd.

[57] ABSTRACT

A holding mechanism for releasably securing a tape cartridge in a tape playing/recording machine is disclosed herein. The holding mechanism consists of a locking bridge that is pivotally supported on a spring carried by the machine so that the locking bridge is biased into a cartridge receiving channel. A notch is located in one wall of the cartridge and is aligned with the locking bridge so that one end of the locking bridge is received into the notch while the opposite end engages the side wall of the cartridge and defines the fulcrum for the biasing forces produced by the spring.

11 Claims, 9 Drawing Figures

HOLDING MECHANISM FOR TAPE CARTRIDGE

BACKGROUND OF THE INVENTION

The present invention relates generally to tape playing/recording devices, and more particularly to an improved releasable securing means for holding tape cartridges in position in a tape machine.

In recent years, numerous advances have been made in tape recording and playing machines. For example, many automobiles now have optional equipment that allows for the playing of tapes in removable cartridges.

In tape machines, particularly of the type that are incorporated into automobiles, it is extremely important that the cartridge be easily removed without the necessity of removing screws or other types of securing devices. Yet, it is equally important that the cartridge be held in a fixed position to insure that the tape is in adequate engagement with the pick-up heads.

While numerous devices have been proposed for releasably securing cartridges in playing machines, these devices have heretofore been rather complicated in construction and require numerous parts which increase the over-all cost of manufacturing as well as maintaining the unit.

SUMMARY OF THE INVENTION

The present invention provides a simple and inexpensive expedient for releasably holding one member in an adjacent member, such as a tape cartridge in a tape machine. The releasable holding mechanism is structured so that the holding force is multiplied when the cartridge is in the fully inserted position.

More specifically, the mechanism for securing one member in a channel of a second member includes a locking bridge that is pivoted intermediate opposite ends on a pivotal connection defined on resilient means that is supported adjacent the elongated channel.

In the illustrated embodiment, the locking bridge has rollers at opposite ends thereof, with the resilient means being in the form of a flat spring cantilevered on the tape machine with the locking bridge pivotally supported on the free end of the spring. The tape cartridge or mating member has a notch in one side wall of the cartridge and the notch is longitudinally aligned with one end of the locking bridge. Also, the side wall has an inclined camming surface adjacent the end of the cartridge that is received into the channel so that the locking bridge is simultaneously pivoted with respect to the spring and moved transversely of the channel when the cartridge is being forced into the channel. In its fully inserted position, the opposite end of the locking lever or bridge acts as a fulcrum for forces that are produced by the spring which force the other end of the lever or bridge into the notch.

The arrangement is such that the locking bridge simultaneously produces holding forces in two different directions to insure that the cartridge is retained in the channel and is forced towards the pick-up heads at all times.

DETAILED DESCRIPTION

Figures 1, 2:
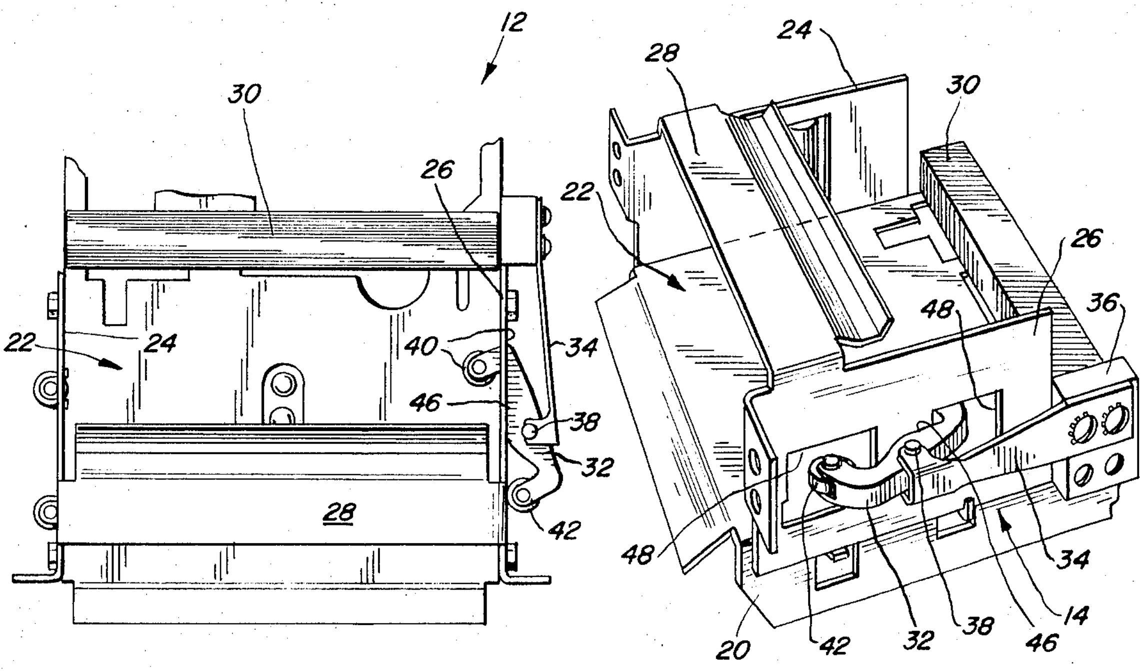
FIG. 1 of the drawing shows a plan view of a fragmentary portion of a tape machine having the securing mechanism of the present invention incorporated therein.
FIG. 2 is a perspective view of the tape machine shown in FIG. 1.
Figure 3:
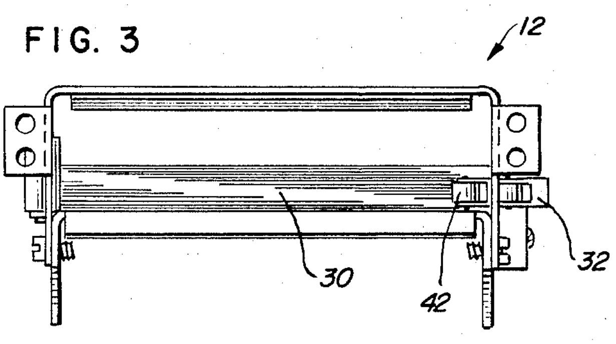
FIG. 3 is an end view of the tape machine.
Figure 4:
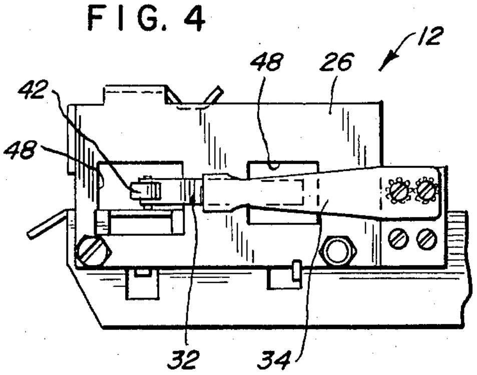
FIG. 4 is a side elevation view of the tape machine.
Figure 5:
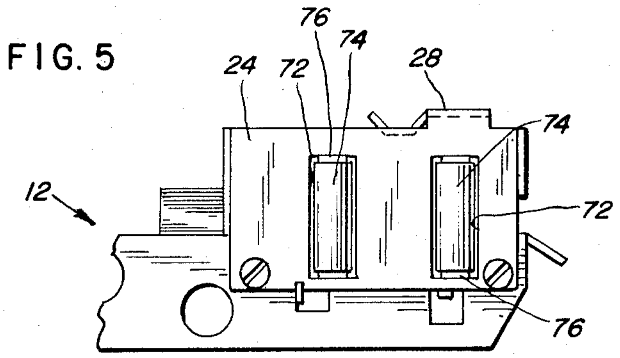
FIG. 5 is a fragmentary side elevation view of the side of the playing machine opposite that shown in FIG. 4.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

Figures 8, 9:
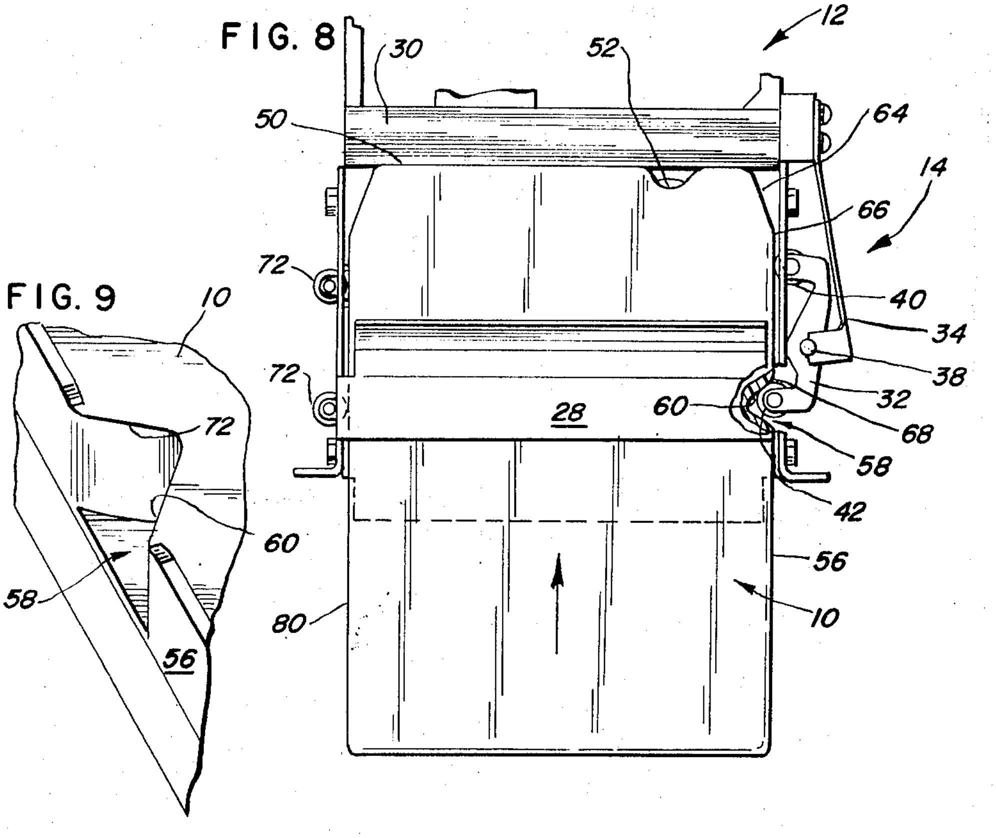
FIG. 8 is a view similar to FIG. 6, the cartridge being shown partially in section, showing the cartridge in its fully inserted position in the channel.
FIG. 9 is a fragmentary perspective view of a portion of the cartridge.

Referring to FIG. 8 of the drawings, there is shown a cartridge or first mating member 10 that is received in an open ended channel in a player/recorder or second mating member 12, and is releasably retained therein by locking mechanism 14 that is constructed in accordance with the teachings of the present invention.

The tape player/recorder or second mating member is shown in detail in FIGS. 1 through 5 and consists of a base or frame 20 that defines an elongated open ended channel 22. The channel 22 may be formed by vertical plates 24 and 26 with a cross member 28 interconnecting the upper ends of the plates. One end of the channel is partially closed by a stop member 30 which defines the fully inserted position for the cartridge that is received into channel 22.

Releasable locking mechanism 14 is most clearly shown in FIG. 2 and consists of a locking bridge 32 that is pivotally supported on a resilient means 34. Resilient means 34 is in the form of a cantilever flat spring that has one end connected to a support block 36, which is rigidly secured to the base 20, and has a pin 38 on the opposite free end defining a pivotal connection that supports the locking bridge 32.

The locking bridge 32 is pivoted intermediate opposite ends on the pin 38 and rollers 40 and 42 are supported for rotation on opposite ends. The spacing between roller 40 and pin (pivotal connection) 38 is approximately twice the spacing of roller 42 from pivotal connection 38, for a purpose that will be described later.

In addition, locking bridge 32 has a generally flat surface portion 46 that is biased into engagement with the outer surface of plate 26, which has openings 48 through which the opposite ends of locking bridge extend.

When the cartridge is removed, as will be explained later, the cantilever flat spring 34 biases the surface portion 46 into engagement with the vertical plate 26 to define a first position for the locking bridge wherein at least a portion of the locking bridge is located within the channel 22, as shown in FIG. 1.

Figure 6:
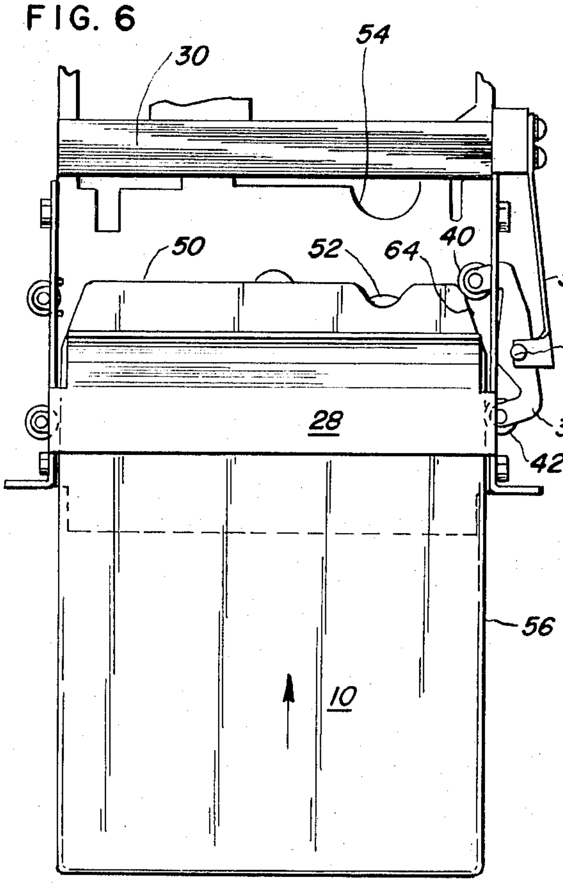
FIG. 6 shows a plan view of the tape machine with the cartridge being aligned for insertion into the cartridge receiving channel.
Figure 7:
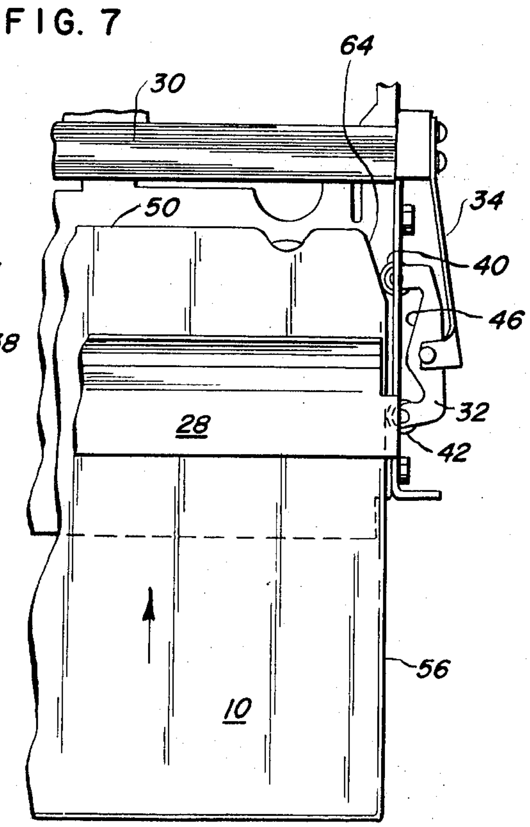
FIG. 7 is a view similar to FIG. 6 showing the cartridge in an intermediate position with respect to the receiving channel.

The cartridge or first mating member 10 is most clearly shown in FIGS. 6 through 8. Cartridge 10 has one end (the forward end) 50 that is adapted to be received into channel 22 and engage the stop member 30 when it is in the fully inserted position in the channel. In this position, the tape (not shown) is clamped between a pinch roller 52 within the cartridge and a drive member (not shown) that occupies a space generally designated by the reference numeral 54 in FIG. 6.

The first mating member or cartridge 10 also has a notch 58 located in one side wall 56 and spaced from the end 50 by a predetermined dimension that will be described later. As shown in FIGS. 8 and 9, notch 58 is substantially V-shaped and has one inclined surface 60 that extends away from the end 50 of cartridge 10. Notch 58 is longitudinally aligned with rollers 40 and 42 when the cartridge 10 is aligned with the channel 22. Also, notch 58 is spaced from end 50 by a longitudinal dimension that is greater than the spacing between rollers 40 and 42 that are located on opposite ends of locking bridge 32.

Side wall 56 also has a beveled end that defines an inclined camming surface 64 between end wall 50 and side wall 56. The trailing edge 66 of inclined camming surface 64 is spaced from an adjacent edge 68 of the notch 58 by a dimension that is substantially greater than the spacing between rollers 40 and 42.

Before describing the operation of the releasable locking mechanism, it should also be noted that the vertical plate 24 (FIG. 5) of the second mating member that defines the channel 22 has a pair of openings 72 with rollers 74 supported for rotation therein through pins 76. The inner edges of rollers 74 are located within channel 22 and are adapted to contact side wall 80 that is located opposite wall 56 which has the notch therein (FIG. 8).

In operation, the locking bridge 32 normally is held in the first position shown in FIG. 1 wherein the flat surface 46 is biased into engagement with plate 26 by spring 34. In this position, roller 40 is located within channel 22 and occupies a space that will ultimately be occupied by the cartridge after it is fully inserted in the channel 22.

To insert the cartridge within the channel in the second mating member or tape player/recorder 12, the cartridge is initially positioned in longitudinal alignment with the elongated channel 22 and during the insertion thereof, the roller 40 on the forward or leading end of locking bridge 32 engages and moves along inclined camming surface 64. During such movement, the forward end having roller 40 thereon is forced out of the channel or pushed aside by the advancing forward end of the first mating member or cartridge. At the same time, the trailing or opposite end of locking bridge 32 has its roller 42 in contacting engagement with side wall 56 so that pin 38 is moved away from the channel 22.

Summarizing this action, the locking bridge 32 is simultaneously pivoted about pivot pin 38 as pivot pin 38 is moved transversely of the channel. This will increase the spring force that is being applied by spring or resilient means 34.

In the intermediate or second position shown in FIG. 7, the roller 40 on the leading end of locking bridge 32 occupies substantially the same position as does roller 42 with respect to the channel 22. Continued forward movement of the cartridge or first mating member will ultimately have roller 42 in transverse alignment with notch 58. When this occurs, the spring force developed by resilient means 34 will force the roller 42 into engagement with the inclined camming surface 60 and the fulcrum for the spring forces will be defined by the roller 40 on the opposite end of locking bridge 32. In the fully inserted position shown in FIG. 8, the roller 42 is still spaced from the base of notch 58 which will tend to produce a component of force directed generally towards the front end 50 of cartridge 10 so that a continuing force is being applied to hold the pinch roller 52 in engagement with the drive member on the player/recorder 12. Because the distance between roller 42 and pin 38 is substantially less (approximately one half) the distance between pivotal connection 38 and roller 40, the moment arm for the spring forces will be substantially greater than if the pivotal connection were equally spaced from opposite ends of the locking bridge. The result is that the spring force from spring 34 will be multiplied or at least enhanced to produce increased holding power for the cartridge.

In removing the cartridge 10 from the holding member 12, it is only necessary to produce a pulling force on the cartridge which will cause roller 42 to move along inclined camming surface 60 and ultimately engage side wall 56. Subsequently, roller 40 will ride along inclined camming surface 64 and the spring or resilient means 34 will tend to pivot locking lever 32 about roller 42 and will ultimately move the locking bridge 32 to the position shown in FIG. 1. Of course, during the insertion and removal of the cartridge 10, the rollers 72 that engage the opposite side 80 of cartridge 10 will substantially reduce the amount of force that is necessary to move the cartridge relative to the channel 22.

As can be appreciated from the above description, the present invention provides a simple foolproof manner of holding a cartridge in a player/recorder and the cartridge can readily be removed without the manipulation of a great number of parts. In addition, there are a minimum number of parts involved in the mechanism and these parts are readily available at a minimum cost.

What is claimed is:

1. Mechanism for securing a first mating member in an elongated channel of a second mating member, comprising: means defining a transversely extending notch in one wall of said first mating member, said notch including a forwardly inclined surface and being spaced from one end of said first mating member that is adapted to be received in said channel; a locking bridge having opposite ends; resilient means carried by said second mating member and defining a movable pivotal connection supporting said locking bridge intermediate said opposite ends, said resilient means being positioned to locate at least a portion of said locking bridge in said channel and longitudinally aligned with said notch when said first mating member is aligned with said channel, said locking bridge being simultaneously pivoted on said second mating member and moved transversely of said channel when said first mating member is moved into said channel, said notch being positioned to receive one end of said locking bridge against said forwardly inclined surface when said first mating member is in a fully inserted position in said channel with the opposite end of said locking bridge engaging said one wall at a location spaced from said notch to retain said one end in said notch, whereby said one end of said locking bridge applies both a forwardly directed biasing force and a laterally directed biasing force against said forwardly inclined surface while said opposite end of said bridge applies a laterally directed biasing force against said one wall at said spaced location.

2. Mechanism as defined in claim 1, in which said locking bridge has freely rotatable rollers on said opposite ends that are adapted to engage said one wall.

3. Mechanism as defined in claim 1, in which said resilient means is a leaf spring supported at one end on said second mating member with said locking bridge pivotally supported on the opposite end of said spring.

4. Mechanism as defined in claim 1, in which said one wall has an inclined camming surface on said one end of said first mating member and in which said opposite end of said locking bridge moves along said inclined camming surface during insertion of said first mating member into said channel and engages said one wall beyond said inclined camming surface when said first mating member is in the fully inserted position.

5. Mechanism as defined in claim 1, in which said one wall has an inclined camming surface extending from said one end and merging with said wall along an edge and in which the spacing between opposite ends of said locking bridge is less than the spacing between said edge of said camming surface and an adjacent edge of said notch.

6. Mechanism as defined in claim 5, further including rollers on opposite ends of said locking bridge for engaging said first mating member.

7. Mechanism as defined in claim 5, in which said opposite end of said locking bridge defines a fulcrum point for a biasing force produced by said resilient means to maintain said one end of said locking bridge in said notch.

8. Mechanism as defined in claim 7, in which the spacing between said pivotal connection and said roller on said opposite end of said locking bridge is greater than the spacing between pivotal connection and said roller on said one end of said locking bridge.

9. Mechanism as defined in claim 1, in which said locking bridge has a generally flat surface portion between said opposite ends and said resilient means biases said surface portion into engagement with an adjacent portion of said second mating member when said first mating member is removed from said channel so that said locking bridge is held in a first position for subsequent reception of said first mating member into said channel.

10. Mechanism as defined in claim 1, in which said resilient means is a cantilever flat spring having one end connected to said second mating member and said pivotal connection on the opposite end and in which said opposite end of said locking bridge defines a fulcrum for spring forces produced by said flat spring.

11. Mechanism as defined in claim 1, in which said first mating member has a further wall opposite said one wall and said second mating member has roller means in contacting engagement with said further wall when said first mating member is received in said channel.

* * * * *